United States Patent
Naik et al.

(10) Patent No.: US 9,677,180 B2
(45) Date of Patent: Jun. 13, 2017

(54) ENGINE HOT SECTION COMPONENT AND METHOD FOR MAKING THE SAME

(75) Inventors: Subhash K. Naik, Carmel, IN (US); Charles J. Teague, Indianapolis, IN (US); James Carl Loebig, Greenwood, IN (US)

(73) Assignees: Rolls-Royce Corporation, Indianapolis, IN (US); Rolls-Royce North America Technologies, Inc., Indianapolis, IN (US)

( * ) Notice: Subject to any disclaimer, the term of this patent is extended or adjusted under 35 U.S.C. 154(b) by 1378 days.

(21) Appl. No.: 13/336,394

(22) Filed: Dec. 23, 2011

(65) Prior Publication Data

US 2012/0195744 A1 Aug. 2, 2012

Related U.S. Application Data

(60) Provisional application No. 61/428,795, filed on Dec. 30, 2010.

(51) Int. Cl.
*C23C 28/04* (2006.01)
*C23C 28/00* (2006.01)
*F01D 5/28* (2006.01)

(52) U.S. Cl.
CPC .......... *C23C 28/042* (2013.01); *C23C 28/044* (2013.01); *C23C 28/3215* (2013.01); *C23C 28/345* (2013.01); *C23C 28/3455* (2013.01); *F01D 5/288* (2013.01); *F05D 2220/3212* (2013.01); *F05D 2300/504* (2013.01); *F05D 2300/611* (2013.01); *Y02T 50/67* (2013.01)

(58) Field of Classification Search
None
See application file for complete search history.

(56) References Cited

U.S. PATENT DOCUMENTS

| 4,942,732 | A | 7/1990 | Priceman | |
| 5,851,679 | A | 12/1998 | Stowell et al. | |
| 6,045,928 | A | 4/2000 | Tsantrizos et al. | |
| 6,054,184 | A | 4/2000 | Bruce et al. | |
| 6,103,315 | A | 8/2000 | Gray et al. | |
| 6,181,727 | B1 * | 1/2001 | Stowell et al. | 372/99 |
| 6,333,099 | B1 | 12/2001 | Strondl et al. | |
| 6,342,278 | B1 | 1/2002 | Rigney et al. | |
| 6,447,854 | B1 | 9/2002 | Rigney et al. | |
| 6,465,090 | B1 * | 10/2002 | Stowell et al. | 428/325 |
| 6,582,834 | B2 * | 6/2003 | Nagaraj et al. | 428/632 |

(Continued)

OTHER PUBLICATIONS

International Search Report and Written Opinion, PCT/US11/67299, Rolls-Royce North American Technologies, Inc., Apr. 26, 2012.

*Primary Examiner* — Michael P Rodriguez
(74) *Attorney, Agent, or Firm* — Shumaker & Sieffert, P.A.

(57) ABSTRACT

One embodiment of the present invention is a unique engine hot section component having a coating system operative to reduce heat transfer to the hot section component. Another embodiment is a unique method for making a gas turbine engine hot section component with a coating system. Other embodiments include apparatuses, systems, devices, hardware, methods, and combinations for gas turbine engines, hot section components and coating systems. Further embodiments, forms, features, aspects, benefits, and advantages of the present application shall become apparent from the description and figures provided herewith.

13 Claims, 2 Drawing Sheets

(56) References Cited

U.S. PATENT DOCUMENTS

| | | |
|---|---|---|
| 6,617,057 B2 | 9/2003 | Gorokhovsky et al. |
| 6,620,457 B2 | 9/2003 | Farmer et al. |
| 6,652,987 B2 | 11/2003 | Allen et al. |
| 6,663,755 B2 | 12/2003 | Gorokhovsky |
| 6,740,364 B2 | 5/2004 | Lau et al. |
| 6,925,811 B2 | 8/2005 | Justis et al. |
| 6,926,496 B2 | 8/2005 | Ackermann et al. |
| 7,003,959 B2 | 2/2006 | Ackermann et al. |
| 7,181,915 B2 | 2/2007 | Ackermann et al. |
| 7,208,230 B2 | 4/2007 | Ackerman et al. |
| 7,830,075 B2 | 11/2010 | Wu |
| 2002/0004143 A1 | 1/2002 | Hasz et al. |
| 2002/0007796 A1 | 1/2002 | Gorokhovsky |
| 2002/0102400 A1 | 8/2002 | Gorokhovsky et al. |
| 2003/0008170 A1 | 1/2003 | Allen et al. |
| 2003/0044624 A1* | 3/2003 | Spitsberg ............... C23C 28/321 428/469 |
| 2003/0129316 A1 | 7/2003 | Darolia et al. |
| 2003/0157361 A1* | 8/2003 | Nagaraj ................ C23C 28/321 428/632 |
| 2003/0224124 A1 | 12/2003 | Lau et al. |
| 2004/0103845 A1 | 6/2004 | Gorokhovsky |
| 2004/0168637 A1* | 9/2004 | Gorokhovsky ......... 118/723 ER |
| 2005/0013993 A1 | 1/2005 | Li et al. |
| 2005/0039459 A1* | 2/2005 | Ackermann ............ F01D 25/08 60/752 |
| 2005/0118334 A1* | 6/2005 | Gorman et al. .............. 427/252 |
| 2008/0220177 A1* | 9/2008 | Hass et al. .................... 427/446 |
| 2009/0186237 A1* | 7/2009 | Lee ....................... C04B 41/009 428/640 |

* cited by examiner

ENGINE HOT SECTION COMPONENT AND METHOD FOR MAKING THE SAME

CROSS REFERENCE TO RELATED APPLICATIONS

The present application claims benefit of U.S. Provisional Patent Application No. 61/428,795, filed Dec. 30, 2010, entitled Engine Hot Section Component And Method For Making The Same, which is incorporated herein by reference.

FIELD OF THE INVENTION

The present invention relates to engines, e.g., gas turbine and other engines, and more particularly, to an engine hot section component and method for making the same.

BACKGROUND

Engine hot section components and coating systems for engine hot section components remain an area of interest. Some existing systems have various shortcomings, drawbacks, and disadvantages relative to certain applications. Accordingly, there remains a need for further contributions in this area of technology.

SUMMARY

One embodiment of the present invention is a unique engine hot section component having a coating system operative to reduce heat transfer to the hot section component. Another embodiment is a unique method for making an engine hot section component with a coating system. Other embodiments include apparatuses, systems, devices, hardware, methods, and combinations for gas turbine engines, hot section components and coating systems. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
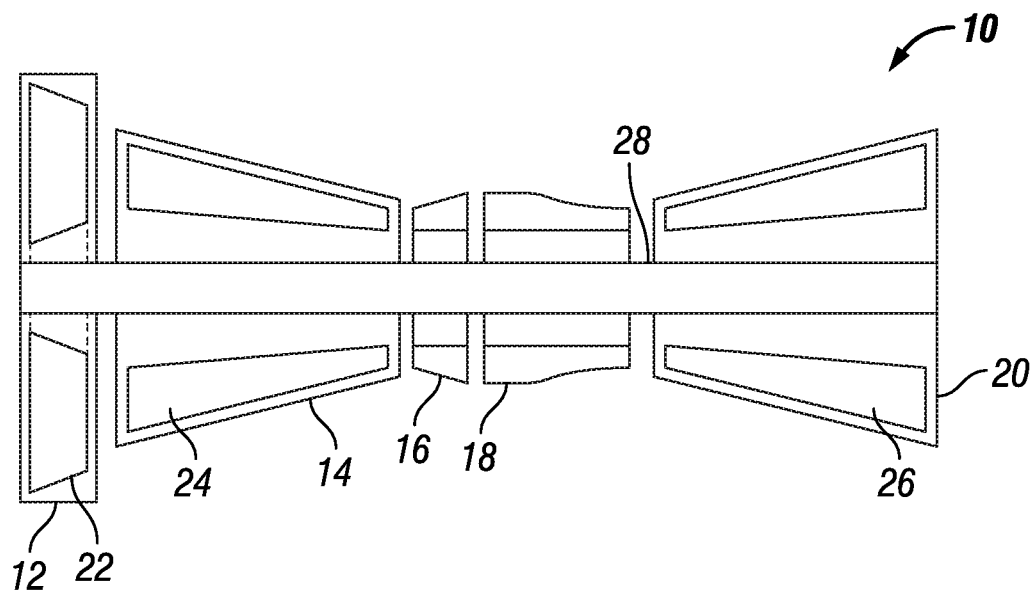
FIG. 1 schematically illustrates some aspects of a non-limiting example of a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular FIG. 1, a non-limiting example of an engine 10 in accordance with an embodiment of the present invention is depicted. In one form, engine 10 is an aircraft propulsion gas turbine engine. In other embodiments, engine 10 may be a land-based or marine engine. In one form, engine 10 is a multi-spool turbofan engine. In other embodiments, gas turbine engine 10 may be a single or multi-spool turbofan, turboshaft, turbojet, turboprop gas turbine or combined cycle engine. In still other embodiments, engine 10 may be ramjet engine, scramjet engine, pulse detonation engine and/or any engine having components exposed to high temperatures.

Gas turbine engine 10 includes a fan system 12, a compressor system 14, a diffuser 16, a combustion system 18 and a turbine system 20. Combustion system 18 is fluidly disposed between compressor system 14 and turbine system 20. Fan system 12 includes a fan rotor system 22. Compressor system 14 includes a compressor rotor system 24. Turbine system 20 includes a turbine rotor system 26. Turbine rotor system 26 is driving coupled to compressor rotor system 24 and fan rotor system 22 via a shafting system 28. Combustion system 18 and turbine system 20 are considered hot sections of gas turbine engine 10, and components of combustion system 18 and turbine system 20 are considered hot section components.

During the operation of gas turbine engine 10, air is drawn into the inlet of fan 12 and pressurized by fan 12. Some of the air pressurized by fan 12 is directed into compressor system 14, and the balance is directed into a bypass duct (not shown). Compressor system 14 further pressurizes the air received from fan 12, which is then discharged in to diffuser 16. Diffuser 16 reduces the velocity of the pressurized air, and directs the diffused airflow into combustion system 18. Fuel is mixed with the air in combustion system 18, which is then combusted in a combustion liner (not shown). The hot gases exiting combustor 18 are directed into turbine system 20, which extracts energy in the form of mechanical shaft power to drive fan system 12 and compressor system 14 shafting system 28. The hot gases exiting turbine system 20 are directed into a nozzle (not shown), and provide a component of the thrust output by gas turbine engine 10.

Figure 2:
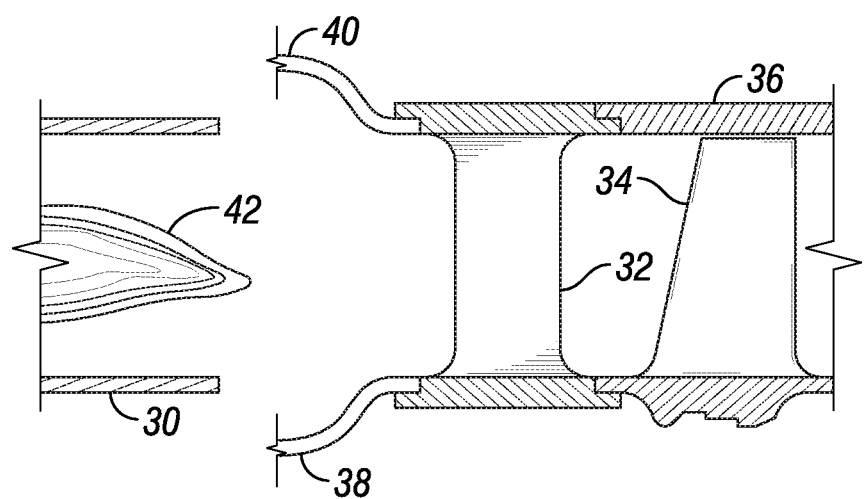
FIG. 2 depicts some aspects of non-limiting examples of a combustion system and turbine system that may be used in conjunction with embodiments of the present invention.

Referring now to FIG. 2, a non-limiting example of some aspects of combustion system 18 and turbine system 20 is schematically depicted. Combustion system 18 includes a combustion liner 30. Turbine system 20 includes a plurality of turbine vanes 32, and a plurality of turbine blades 34 operationally disposed within a plurality of blade tracks 36. Disposed between vanes 32 and liner 30 are transition duct walls 38 and 40. Transition duct walls 38 and 40 are operative to guide hot gases from combustion system 18 into turbine vanes 32. During the operation of engine 10, combustion liner 30 contains one or more combustion flames. Each of combustion liner 30, turbine vanes 32, turbine blades 34, blade tracks 36 and transition duct walls 38 and 40 have surfaces that are in line-of-sight radiative communication with a combustion flame 42 during the operation of gas turbine engine 10, resulting in radiative heat transfer from combustion flame 42 to those surfaces of combustion liner 30, turbine vanes 32, turbine blades 34, blade tracks 36 and transition duct walls 38 and 40 during the operation of engine 10. Each of combustion liner 30, turbine vanes 32, turbine blades 34, blade tracks 36 and transition duct walls 38 and 40 have surfaces that are also exposed to radiation from combustion flame 42 via reflection.

In order to protect one or more surfaces of components that are exposed to high temperatures resulting from the combustion of fuel and air in combustion system 18, e.g., combustion flame 42, it is desirable to provide coatings on components so exposed. In accordance with embodiments of the present invention, the coatings include radiation barrier coatings. In other embodiments, the protective coatings also include thermal barrier coatings (TBC). In still other embodiments, one or more bond coats and adhesion aid coatings are layered between the protective coating layers, e.g., to increase coating durability. Embodiments of the present invention are applicable to gas turbine engine hot section components and hot section components of other engines, including stationary components, rotating components, translating components and reciprocating components.

Figure 3:
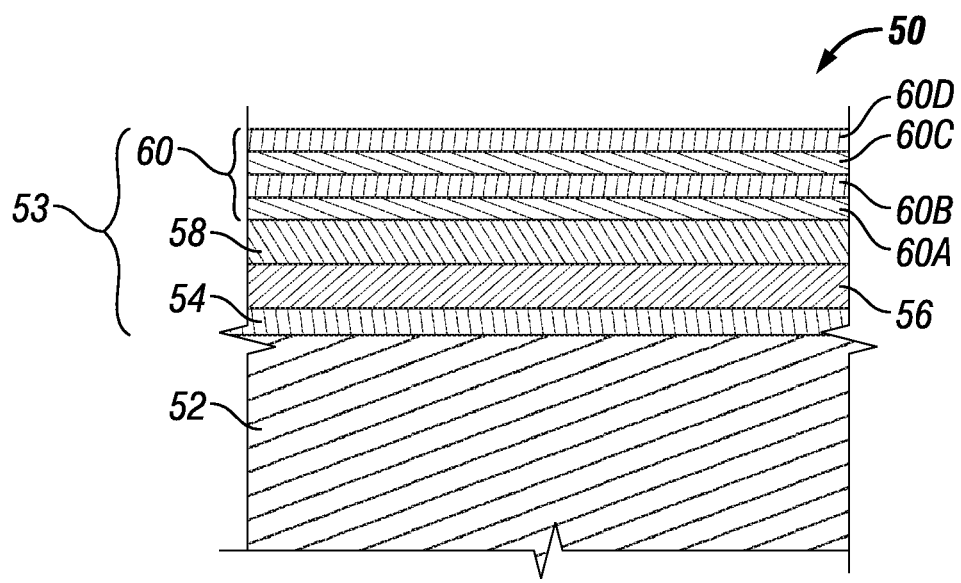
FIG. 3 schematically illustrates some aspects of a non-limiting example of a hot section component in accordance with an embodiment of the present invention.

Referring now to FIG. 3, a non-limiting example of a gas turbine hot section component 50 is depicted. In one form, component 50 is a combustion liner, such as combustion liner 30. In other embodiments, gas turbine engine 10 may include a plurality of components 50 in the form of one or more of turbine vanes 32, turbine blades 34, blade tracks 36 and transition duct walls 38 and 40. In still other embodiments, component 50 may be any hot section component that is exposed to hot gases from the combustion process that takes place in a combustion system, e.g., such as combustion system 18, during the operation of an engine.

In the depicted embodiment, component 50 includes a substrate 52 and a coating system 53. In one form, substrate 52 is the base material from which component 50 is formed. In other embodiments, substrate 52 may be any portion or material used in the construction of component 50.

Coating system 53 is operative to reduce heat transfer to substrate 52. In one form, coating system 53 is configured to reduce radiative heat transfer to substrate 52. In one form, coating system 53 is configured to reduce radiative and convective heat transfer to component 50. In other embodiments, coating system may also be configured to reduce conductive heat transfer to component 50.

In one form, coating system 53 includes a bond coat 54, a TBC coating 56, an adhesion aid 58 and a radiation barrier coating system 60. However, in an elemental form, component 50 may include only substrate 52 and radiation barrier coating system 60. Embodiments may include, in addition to radiation barrier coating system 60, other coatings in addition or in place of, such as bond coat 54, TBC coating 56 and adhesion aid 58, and may contain a greater or lesser number of coatings and coating types. In other embodiments, component 50 may include more layers than those illustrated and described herein or may employ less layers.

Bond coat 54 is configured to provide an adherent surface for adhering TBC coating 56 to substrate 52. In one form, bond coat 54 is also configured as an oxidation and corrosion resistant layer to protect substrate 52 from environmental degradation in the presence of hot combustion gases. In other embodiments, bond coat 54 may be configured only or primarily for adhering TBC coating 56 to substrate 52. In one form, bond coat 54 is a MCrAlY, wherein M may be Co, Ni or Co/Ni. In other embodiments, other bond coat materials may be employed, for example and without limitation, other aluminum rich layers operative to form protective alumina scale over substrate 52, such as a low sulphur platinum aluminide. In one form, bond coat 54 is applied using large area filtered arc deposition (LAFAD) processing with ion assisted arc deposition (IAAD). In other embodiments, other processes may be employed to apply bond coat 54 to substrate 52, e.g., directed vapor deposition (DVD), low pressure plasma spray (LPPS) and/or pack cementation. Some embodiments may not include bond coat 54.

TBC coating 56 is operative to reduce heat transfer from the hot combustion gases supplied by combustion system 18. In one form, TBC coating 56 is a yttria stabilized zirconia (YSZ) layer. In a particular form, TBC coating 56 is an 8% YSZ layer. In one form, TBC coating 56 is applied to component 50, e.g., on top of bond coat 54, using large area filtered arc deposition (LAFAD) processing with ion assisted arc deposition (IAAD). In other embodiments, other processes may be employed to apply TBC coating 56 to bond coat 54, e.g., directed vapor deposition (DVD), air plasma spray (APS) or another thermal spray system and/or electron beam physical vapor deposition (EB-PVD). Some embodiments may not include TBC coating 56.

In one form, TBC coating 56 is processed with a surface finish enhancing treatment that is operative to enhance the reflectivity of TBC coating 56. In one form of surface finish enhancing treatment, TBC coating 56 is diamond polished. In other embodiments, other surface finish enhancing treatments may be employed. Some surface finish enhancing treatments may include, for example and without limitation, tumbling in a vibratory finishing machine, and laser finishing. In other embodiments, TBC coating 56 may not receive any surface finish treatment processes.

Adhesion aid 58 is operative to provide an adherent surface for adhering radiation barrier coating system 60 to component 50, e.g., to TBC coating 56, which in some embodiments increases the durability of the component 50 coating system. In one form, adhesion aid 58 is alumina. In other embodiments, other adhesion aid materials may be employed, for example, mullite, silicates and/or zircon. Some embodiments may not include adhesion aid 58.

In one form, adhesion aid 58 is processed with a surface finish enhancing treatment to improve the reflectivity of adhesion aid 58. In one form of surface finish enhancing treatment, adhesion aid 58 is diamond polished. In other embodiments, other surface finish enhancing treatments may be employed. Some surface finish enhancing treatments may include, for example and without limitation, tumbling in a vibratory finishing machine, and laser finishing. In other embodiments, adhesion aid 58 may not receive any surface finish treatment processes.

Radiation barrier coating system 60 is a multi-layered radiation barrier coating system formed of radiation barriers that are selected for have differing refraction indexes. The refraction indexes of each layer are selected to configure radiation barrier coating system 60 to reflect radiant energy from substrate 52. In one form, the refraction indexes are selected to configure radiation barrier coating system 60 to reflect radiant energy from combustion flame 42 away from component 50 to reduce radiative heat transfer from combustion flame 42 to component 50. Accordingly, in some embodiments radiation barrier coating system 60 includes materials that are selected to refract and reflect radiant energy in the wavelength range of 200-700 nm. The range of 200-700 nm was determined to be appropriate, including by testing. In other embodiments, radiant barrier coating system 60 may be configured to refract and reflect radiant energy at desired wavelengths within and/or without the range of 200-700 nm.

In one form, radiation barrier coating system 60 includes alternating high refractive index materials and low refractive index materials. By alternating high and low refractive index radiation barrier coatings, radiation barrier coating system 60 increases the reflection of radiant energy from component 50 relative to systems that do not so alternate high and low index of refraction coatings. As used herein with respect to refraction index, the terms "high" and "low" pertain to the refractive indexes of the coatings materials in the comparative sense, not in the absolute sense. The terms "high" and "low," as used herein with respect to refraction indexes are not to be construed as limiting radiation barrier coating system 60 to any particular materials or indexes of refraction.

The radiation barrier coatings are selected for their refraction indexes, among other things, e.g., temperature capability, oxidation resistance, hot corrosion resistance. In particular, the radiation barrier coatings are selected for having different refraction indexes, e.g., as between adjacent radiation barrier coating layers. In one form, the index of refraction is based on the coating elemental composition. In some embodiments, the index of refraction is based not only on the material composition, but also based on how the composition is manufactured and processed, how the composition is applied to the component, and/or any processing after the composition is applied to the component. The radiation barrier coatings are configured to reflect radiant energy from combustion flame 42 away from substrate 52, e.g., radiant energy at preselected wavelengths, such as the wavelengths of combustion flame 42 that would otherwise result in undesirable heat transfer to substrate 52.

In one form, radiation barrier coating system 60 includes a plurality of radiation barrier coatings, depicted as radiation barrier coatings 60A, 60B, 60C and 60D. Radiation barrier coating 60A is applied onto component 50, e.g., onto adhesion aid 58, and radiation barrier coating 60B is applied over radiation barrier coating 60B. Radiation barrier coating 60C is applied onto radiation barrier coating 60B, and radiation barrier coating 60D is applied over radiation barrier coating 60C. In other embodiments, radiation barrier coating system 60 may include only two radiation barrier layers, e.g., radiation barrier coating 60A and radiation barrier coating 60B. In still other embodiments, radiation barrier coating system 60 may include only three layers, e.g., radiation barrier coating 60A, radiation barrier coating 60B and radiation barrier coating 60C. In yet still other embodiments, more than four of radiation barrier coatings may be employed.

In the embodiment illustrated in FIG. 3, there are no adhesion aids between the layers 60A, 60B, 60C and 60D of radiation barrier coating materials. In other embodiments, adhesion aids may be employed between some or all layers of radiation barrier coatings in order to aid the adhesion of one layer to the other. In still other embodiments, other coatings between two or more of radiation barrier coatings 60A-60D and/or between any other coating layers deposited onto component 50 may be employed to reduce the adverse effects of differential thermal expansion between layers 60A-60D and/or other coating layers.

Also, in the embodiment of FIG. 3, the individual radiation barrier coating layers 60A-60D do not receive any surface finish enhancing treatment. In other embodiments, surface finish enhancing treatments to improve the reflectivity of one or more or radiation barrier coatings 60A-60D and/or of any adhesion aid disposed between radiation barrier coatings may be employed. Surface finish enhancing treatments may include, for example and without limitation, diamond polishing, tumbling in a vibratory finishing machine, and laser finishing.

Examples of materials for radiation barrier coatings 60A and 60B include aluminum oxide ($Al_2O_3$), mullite, $SiO_2$, tantala, rutile ($TiO_2$) and niobium oxide ($Nb_2O_5$). Other materials may be employed in addition to or in place of those mentioned herein. Of those listed above, tantala, rutile ($TiO_2$) and $Nb_2O_5$ have high indexes of refraction relative to the index of refraction of each of $Al_2O_3$, mullite and $SiO_2$.

In one form, radiation barrier coating 60A has a lower index of refraction than radiation barrier coating 60B; radiation barrier coating 60C has a lower index of refraction than radiation barrier coating 60B, and radiation barrier coating 60D has a higher index of refraction than radiation barrier coating 60C. In other embodiments, other relative variations in index of refraction between the layers may be employed. For example, in some embodiments, radiation barrier coating 60A has a higher index of refraction than radiation barrier coating 60B.

In one form, radiation barrier coating 60A is formed of $Al_2O_3$. In other embodiments, radiation barrier coating 60A is made from mullite, $SiO_2$ and/or other material(s) that have a refraction index less than that of radiation barrier coating 60B, in addition to or in place of $Al_2O_3$. In one form, radiation barrier coating 60B is formed of rutile ($TiO_2$). In other embodiments, radiation barrier coating 60B is made from tantala, rutile ($TiO_2$) and $Nb_2O_5$ and/or other material(s) that have a refraction index greater than that of radiation barrier coating 60A, in addition to or in place of rutile. In one form, radiation barrier coating 60C is formed of $Al_2O_3$. In other embodiments, radiation barrier coating 60C is made from mullite, $SiO_2$ and/or other material(s) that have a refraction index less than that of radiation barrier coating 60B, in addition to or in place of $Al_2O_3$. In one form, radiation barrier coating 60D is formed of rutile ($TiO_2$). In other embodiments, radiation barrier coating 60D is made from tantala, rutile ($TiO_2$) and $Nb_2O_5$ and/or other material(s) that have a refraction index greater than that of radiation barrier coating 60C, in addition to or in place of rutile.

In one form, radiation barrier coatings 60A-60D applied to component 50, e.g., on top of bond coat 54, using large area filtered arc deposition (LAFAD) processing with ion assisted arc deposition (IAAD). In other embodiments, other processes may be employed to apply radiation barrier coatings 60A-60D, e.g., directed vapor deposition (DVD), air plasma spray (APS) or another thermal spray system and/or electron beam physical vapor deposition (EB-PVD).

Embodiments of the present invention include a method for manufacturing a gas turbine engine hot section component, comprising: selecting a first radiation barrier coating for a first refraction index; selecting a second radiation barrier coating for a second refraction index different from the first refraction index; applying the first radiation barrier coating onto the gas turbine engine hot section component; and applying the second radiation barrier coating over the first radiation barrier coating.

In a refinement, the method further comprises applying the first radiation barrier coating over a first application of the second radiation barrier coating.

In another refinement, the method further comprises applying the second radiation barrier coating over a second application of the first radiation barrier coating.

In yet another refinement, the second refraction index is greater than the first refraction index.

In still another refinement, a first radiation barrier coating material includes one or more of aluminum oxide ($Al_2O_3$), mullite and $SiO_2$.

In yet still another refinement, a second radiation barrier coating material includes one or more of tantala, rutile ($TiO_2$) and niobium oxide ($Nb_2O_5$).

In a further refinement, the method further comprises performing a surface finish enhancing treatment on the gas turbine engine hot section component prior to applying at least one of the first radiation barrier coating and the second radiation barrier coating.

Embodiments of the present invention include a method for manufacturing an engine hot section component, comprising: applying a thermal barrier coating (TBC) to the engine hot section component; applying a first radiation barrier coating onto the TBC; and applying a second radiation barrier coating material over the first radiation barrier coating, wherein the second radiation barrier coating material is selected for having a different index of refraction than the first radiation barrier coating.

In a refinement, the TBC includes Yttria-Stabilized Zirconia (YSZ).

In another refinement, the method further comprises applying a bond coat to the component prior to applying the TBC.

In yet another refinement, the bond coat is an MCrAlY bond coat, and where M=Co, Ni or Co/Ni.

In still another refinement, the method further comprises performing a surface finish treatment on the TBC prior to application of the first radiation barrier coating, wherein the surface finish treatment is operative to enhance reflective properties of the component.

In yet still another refinement, the method further comprise applying an adhesion aid to the TBC prior to application of the first radiation barrier coating.

In a further refinement, the adhesion aid includes one or more of alumina, mullite, silicates and zircon.

In a yet further refinement, the method further comprises performing a surface finish treatment on the adhesion aid prior to application of the first radiation barrier coating, wherein the surface finish treatment is operative to enhance reflective properties of the component.

In a still further refinement, a first radiation barrier coating material includes one or more of aluminum oxide ($Al_2O_3$), mullite and $SiO_2$.

In a yet still further refinement, the second radiation barrier coating material includes one or more of tantala, rutile ($TiO_2$) and niobium oxide ($Nb_2O_5$).

In an additional refinement, the first radiation barrier coating is applied using large area filtered arc deposition (LAFAD) processing with ion assisted arc deposition (IAAD).

In another additional refinement, the first radiation barrier coating is applied using directed vapor deposition (DVD) processing.

In yet another additional refinement, an inert gas is used to transport a first radiation barrier coating material to the component.

Embodiments of the present invention include an engine hot section component, comprising: a substrate having a surface in line-of-sight radiative communication with a combustion flame during operation of an engine; a first radiation barrier coating positioned between the substrate and the combustion flame; a second radiation barrier coating positioned between the first radiation barrier coating and the combustion flame, wherein the first radiation barrier coating has a first index of refraction; the second radiation barrier coating has a second index of refraction different from the first index of refraction, and wherein the first radiation barrier coating and the second radiation barrier coating are configured to reflect radiant energy at preselected wavelengths from the combustion flame away from the substrate.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method for manufacturing a gas turbine engine hot section component, the method comprising:
    selecting a first radiation barrier coating composition comprising tantalum oxide for a first refraction index;
    selecting a second radiation barrier coating composition comprising mullite for a second refraction index different from the first refraction index;
    performing a surface finish enhancing treatment on the gas turbine engine hot section component; and
    after performing the surface finish enhancing treatment, applying a plurality of pairs of alternating layers of the first radiation barrier coating composition and the second radiation barrier coating composition onto the gas turbine engine hot section component.

2. The method of claim 1, wherein applying the plurality of pairs of alternating layers of the first radiation barrier coating composition and the second radiation barrier coating composition comprises applying a layer of the first radiation barrier coating composition to the gas turbine engine hot section component and applying a layer of the second radiation barrier coating composition to the layer of the first radiation barrier coating composition.

3. The method of claim 1, wherein applying the plurality of pairs of alternating layers of the first radiation barrier coating composition and the second radiation barrier coating composition comprises applying a layer of the second radiation barrier coating composition to the gas turbine engine hot section component and applying a layer of the first radiation barrier coating composition to the layer of the second radiation barrier coating composition.

4. A method for manufacturing an engine hot section component, the method comprising:
    applying a thermal barrier coating (TBC) to the engine hot section component;
    performing a surface finish enhancing treatment on the TBC, wherein the surface finish enhancing treatment enhances reflective properties of the TBC; and
    after performing the surface finish enhancing treatment on the TBC, applying a plurality of pairs of alternating layers of a first radiation barrier coating composition and a second radiation barrier coating composition onto the TBC, wherein the first radiation barrier coating composition comprises tantalum oxide and has a first refraction index, and wherein the second radiation barrier coating composition comprises mullite and has a second, different refraction index.

5. The method of claim 4, wherein the TBC includes Yttria-Stabilized Zirconia (YSZ).

6. The method of claim 4, further comprising applying a bond coat to the engine hot section component prior to applying the TBC.

7. The method of claim 6, wherein the bond coat is an MCrAlY bond coat, and where M=Co, Ni or Co/Ni.

8. The method of claim 4, further comprising applying an adhesion aid to the TBC prior to applying the first radiation barrier coating.

9. The method of claim 8, wherein the adhesion aid includes at least one of alumina, mullite, a silicate, or zircon.

10. The method of claim 8, further comprising performing a surface finish treatment on the adhesion aid prior to applying the first radiation barrier coating, wherein the surface finish treatment enhances reflective properties of the adhesion aid.

11. The method of claim 4, wherein the first radiation barrier coating is applied using large area filtered arc deposition (LAFAD) processing with ion assisted arc deposition (IAAD).

12. The method of claim 4, wherein the first radiation barrier coating is applied using directed vapor deposition (DVD) processing.

13. The method of claim 12, wherein an inert gas is used to transport a first radiation barrier coating material to the component to apply the first radiation barrier coating.

* * * * *